(12) United States Patent
Miehle

(10) Patent No.: US 11,283,171 B2
(45) Date of Patent: *Mar. 22, 2022

(54) PHASED ARRAY ANTENNA SYSTEM

(71) Applicant: VIASAT, INC., Carlsbad, CA (US)

(72) Inventor: Konrad Miehle, Queen Creek, AZ (US)

(73) Assignee: VIASAT, INC., Carlsbad, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/750,658

(22) Filed: Jan. 23, 2020

(65) Prior Publication Data

US 2020/0168990 A1    May 28, 2020

Related U.S. Application Data

(63) Continuation of application No. 15/978,909, filed on May 14, 2018, now Pat. No. 10,573,965.

(51) Int. Cl.
*H01Q 3/26* (2006.01)
*H01Q 3/44* (2006.01)
(Continued)

(52) U.S. Cl.
CPC .............. *H01Q 3/44* (2013.01); *H01Q 3/28* (2013.01); *H01Q 23/00* (2013.01)

(58) Field of Classification Search
CPC ............ H01Q 23/00; H01Q 3/22; H01Q 3/24; H01Q 3/26; H01Q 3/2629; H01Q 3/28;
(Continued)

(56) References Cited

U.S. PATENT DOCUMENTS 3,710,145 A * 1/1973 Williamson ........... H03K 17/76
327/109
3,978,482 A   8/1976 Williams et al.
(Continued)

FOREIGN PATENT DOCUMENTS

WO      2016/153459 A1    9/2016

OTHER PUBLICATIONS

Bregman, et al.: Minimum Receiver Noise in Phased Array Feeds and Aperture Arrays; found on the internet May 14, 2018 at: http://www.ursi.org/proceedings/procGA08/papers/JP02p4.pdf.
(Continued)

*Primary Examiner* — Tho G Phan
(74) *Attorney, Agent, or Firm* — Snell & Wilmer L.L.P.

(57) ABSTRACT

Systems and methods are provided for implementing a phased array antenna having a boresight direction. A scan angle within a defined range of scan angles is selected for the phased array antenna such that the selected scan angle is different from a scan angle associated with the boresight direction. An antenna port impedance associated with each of a plurality of antenna elements comprising the phased array antenna varies with the scan angle of the phased array antenna. A plurality of amplifiers are each coupled to an antenna port of one of the plurality of antenna elements. Each of the plurality of amplifiers is configured such that a maximum value for a performance characteristic of the plurality of amplifiers is achieved when an impedance at the antenna port corresponds to the selected scan angle.

10 Claims, 8 Drawing Sheets

(51) Int. Cl.
*H01Q 3/28* (2006.01)
*H01Q 23/00* (2006.01)

(58) Field of Classification Search
CPC ............ H01Q 3/44; H01Q 21/29; H01Q 3/36; H01Q 31/36; H04B 1/04; H04B 1/0458
See application file for complete search history.

(56) References Cited

U.S. PATENT DOCUMENTS

| | | | |
|---|---|---|---|
| 3,999,182 | A | 12/1976 | Moeller et al. |
| 4,079,380 | A | 3/1978 | Esry et al. |
| 4,150,382 | A | 4/1979 | King |
| 4,682,176 | A | 7/1987 | Jones |
| 4,882,588 | A | 11/1989 | Renshaw et al. |
| 5,034,752 | A | 7/1991 | Pourailly et al. |
| 5,128,683 | A | 7/1992 | Freedman et al. |
| 6,549,164 | B2 * | 4/2003 | Paschen ................ H01Q 3/267 342/371 |
| 6,856,284 | B1 * | 2/2005 | Cangiani ................ H01Q 1/288 342/154 |
| 7,728,772 | B2 * | 6/2010 | Mortazawi ........... H01Q 21/064 342/375 |
| 7,868,830 | B2 | 1/2011 | Worl et al. |
| 9,379,438 | B1 | 6/2016 | Runyon et al. |
| 9,755,306 | B1 | 9/2017 | Ogilvie |
| 10,090,605 | B2 | 10/2018 | Chou et al. |
| 10,573,965 | B2 * | 2/2020 | Miehle ................. H04B 1/0458 |
| 10,665,959 | B2 * | 5/2020 | Paulotto ................ H01Q 21/28 |
| 2017/0170556 | A1 | 6/2017 | Carey et al. |
| 2018/0069605 | A1 | 3/2018 | Gharavi et al. |

OTHER PUBLICATIONS

Maaskant, et al.: "Applying the Active Antenna Impedance to Achieve Noise Match in Receiving Array Antennas"; Published in: Antennas and Propagation Society International Symposium, 2007 IEEE; Date of Conference: Jun. 9-15, 2007; Date Added to IEEE Xplore: Dec. 6, 2007; DOI: 10.1109/APS.2007.4396892 Publisher: IEEE; Conference Location: Honolulu, HI, USA.

Matsumoto, et al.: "3-6-3 Beam Forming Network"; Journal of the National Institute of Information and Communications Technology, vol. 50, No. 3/4, 2003; found on the internet May 14, 2018 at: http://www.nict.go.jp/publication/shuppan/kihou-journal/journal-vol50no3.4/journal-vol50no3.4_030603.pdf.

Nikkhah, et al.: "Compact Low-Cost Phased Array of Dielectric Resonator Antenna Using Parasitic Elements and Capacitor Loading"; Published in: IEEE Transactions on Antennas and Propagation (vol. 61, Issue: 4, Apr. 2013 ) pp. 2318-2321; Date of Publication: Jan. 3, 2013; DOI:10.1109/TAP.2012.2237535.

Sanadgol, et al.: "60 GHz Substrate Integrated Waveguide Fed Steerable LTCC Antenna Array"; Published in Antennas and Propagation (EuCAP), 2010 Proceedings of the Fourth European Conference on Date of Conference: Apr. 12-16, 2010; Date Added to IEEE Xplore: Jul. 8, 2010; Print ISSN: 2164-3342; Conference Location: Barcelona, Spain.

Weem, et al.: "A Method for Determining Noise Coupling in a Phased Array Antenna"; Published in: Microwave Symposium Digest, 2001 IEEE MTT-S International; Date of Conference: May 20-24, 2001; Date Added to IEEE Xplore: Aug. 6, 2002; Print ISSN: 0149-645X; DOI: 10.1109/MWSYM.2001.966886 Publisher: IEEE Conference Location: Phoenix, AZ, USA, USA.

International Search Report for corresponding PCT/US2019/030693; mailed from ISA/EPO dated Jul. 30, 2019.

* cited by examiner

PHASED ARRAY ANTENNA SYSTEM

CROSS-REFERENCE TO RELATED APPLICATIONS

This application is a continuation of U.S. patent application Ser. No. 15/978,909, filed 14 May 2018 incorporated herein by reference in its entirety.

TECHNICAL FIELD

The disclosure relates generally to the field of communications, and more particularly to a phased array antenna.

BACKGROUND

A phased array, or electronically scanned array, is a controlled array of antennas that creates a beam of radio waves which can be electronically steered to point in different directions without moving the antennas. In an array antenna, the radio frequency current from the transmitter is fed to the individual antennas with the correct phase relationship so that the radio waves from the separate antennas add together to increase the radiation in a desired direction while cancelling to suppress radiation in undesired directions. Directional regions of high gain, referred to as "beams," are formed by shifting the phase of the signal emitted from each radiating element to provide constructive and destructive interference to steer the beams in a desired direction. The relative amplitudes of the signals radiated by the individual antennas determine the effective radiation pattern of the array. A phased array may be used to point a fixed radiation pattern, or to scan rapidly in azimuth or elevation.

SUMMARY

In accordance with one example, a phased array antenna is provided that includes an array of antenna elements having a beam with a boresight direction. A plurality of phase shifters are responsive to commands to adjust phases of a plurality of radio frequency (RF) signals communicated with the array of antenna elements. A controller provides the commands to the plurality of phase shifters. The provided commands are used by the plurality of phase shifters to direct the beam within a range of scan angles relative to the boresight direction. A plurality of amplifiers amplify the plurality of signals. Each of the plurality of amplifiers is coupled to an antenna port of the array of antenna elements and has a performance characteristic that depends on antenna port impedance at the antenna port. The antenna impedance varies with a scan angle of the beam within the range of scan angles, and the amplifiers are configured such that a maximum of the performance characteristic is achieved at a value of the antenna port impedance that corresponds to a particular scan angle within the range of scan angles that differs from the boresight direction.

In accordance with another example, a method is provided for implementing a phased array antenna having a boresight direction. A scan angle within a defined range of scan angles is selected for the phased array antenna such that the selected scan angle is different from a scan angle associated with the boresight direction. An antenna port impedance associated with each of a plurality of antenna elements comprising the phased array antenna varies with the scan angle of the phased array antenna. A plurality of amplifiers are each coupled to an antenna port of one of the plurality of antenna elements. Each of the plurality of amplifiers is configured such that a maximum value for a performance characteristic of the plurality of amplifiers is achieved when an impedance at the antenna port corresponds to the selected scan angle.

In accordance with yet another example, a phased array antenna includes an array of antenna elements having a beam with a boresight direction. A first set of phase shifters is responsive to commands to adjust phases of radio frequency (RF) signals received at the array of antenna elements. A second set of phase shifters is responsive to commands to adjust phases of transmit signals for transmission by the array of antenna elements. A controller provides the commands to the first set of phase shifters and the second set of phase shifters. The provided commands are used to direct the beam within a range of scan angles relative to the boresight direction. A first set of amplifiers amplifies the signals received at the array of antenna elements. Each of the first set of amplifiers is coupled to an antenna port of the array of antenna elements and has a first performance characteristic that depends on antenna port impedance at the antenna port. The antenna impedance varies with a scan angle of the beam within the range of scan angles, with a maximum of the first performance characteristic achieved at a first value of the antenna port impedance that corresponds to a first scan angle that differs from the boresight direction. A second set of amplifiers amplifies the transmit signals to be transmitted by the array of antenna elements. Each of the second set of amplifiers is coupled to an antenna port of the array of antenna elements and has a second performance characteristic that depends on antenna port impedance at the antenna port with a maximum of the second performance characteristic achieved at a second value of the antenna port impedance that corresponds to a second scan angle that differs from each of the boresight direction and the first scan angle.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION

Figure 1:
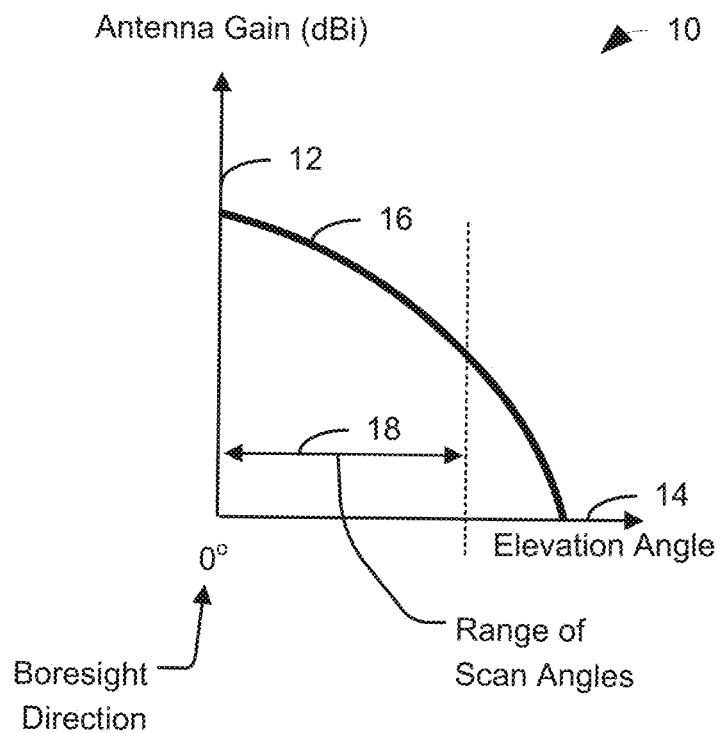
FIG. 1 is a chart illustrating one example of a decline in antenna gain.

In a phased array antenna, the antenna gain of the beam is reduced as the scan angle varies from the boresight direction, where the antenna provides maximum gain. This is referred to as scan loss. The scan angle is in the coordinate system of the antenna and may vary along multiple axes (e.g., azimuth and elevation). FIG. 1 is a chart 10 illustrating one example of a reduction in antenna gain of an array of antenna elements of a phased array antenna, represented in decibels of gain relative to an isotropic radiator (dBi) on a vertical axis 12 with angle (elevation angle in this example), represented in degrees relative to a boresight direction on a horizontal axis 14. As can be seen from the plot 16, the antenna gain drops significantly over a range of scan angles 18 associated with the system as the elevation angle departs from the boresight direction.

The performance of amplifiers coupled to the array of antenna elements of the phased array antenna can also depend on antenna impedance of the antenna elements of the array, which changes with scan angle. The antenna impedance can vary from embodiment to embodiment based on various factors, and can for example be determined empirically and/or analytically. Optimizing amplifier performance for the antenna impedance at the boresight direction results in a reduction in amplifier performance at scan angles distant from the boresight direction. One approach to mitigating the amplifier sensitivity to antenna impedance is to place an isolator between them. However, in large arrays, doing so may be prohibitively expensive. In addition, RF losses of the isolator impact antenna performance.

The combination of scan loss and reduced amplifier performance at scan angles different from the boresight direction jointly cause significant degradation in the overall performance of an antenna system. Accordingly, the systems and methods described herein mitigate the impact of gain loss at higher scan angles by configuring the amplifiers such that the maximum of a performance characteristic of the amplifiers corresponds to the antenna impedance at a scan angle different than the boresight direction of maximum antenna gain. As used herein, the maximum of the performance characteristic denotes a relative maximum value over the range of scan angles that the phased array antenna is configured to operate via commands provided to phase shifters. The performance characteristic can vary from embodiment to embodiment and can depend on whether the phased array antenna is used for transmission and/or reception. As used herein, "performance characteristic" of an amplifier generally refers to any metric of the amplifier for which a higher value indicates better amplifier performance. In some embodiments, the maximum of the "performance characteristic" of the amplifier is achieved by minimizing a parameter for which a lower value indicates better performance. For example, in some embodiments described herein, the maximum of output signal-to-noise ratio (SNR) to input SNR of the amplifier is achieved by minimizing its noise figure, since noise figure is the ratio of input SNR to output SNR in dB.

Figure 2:
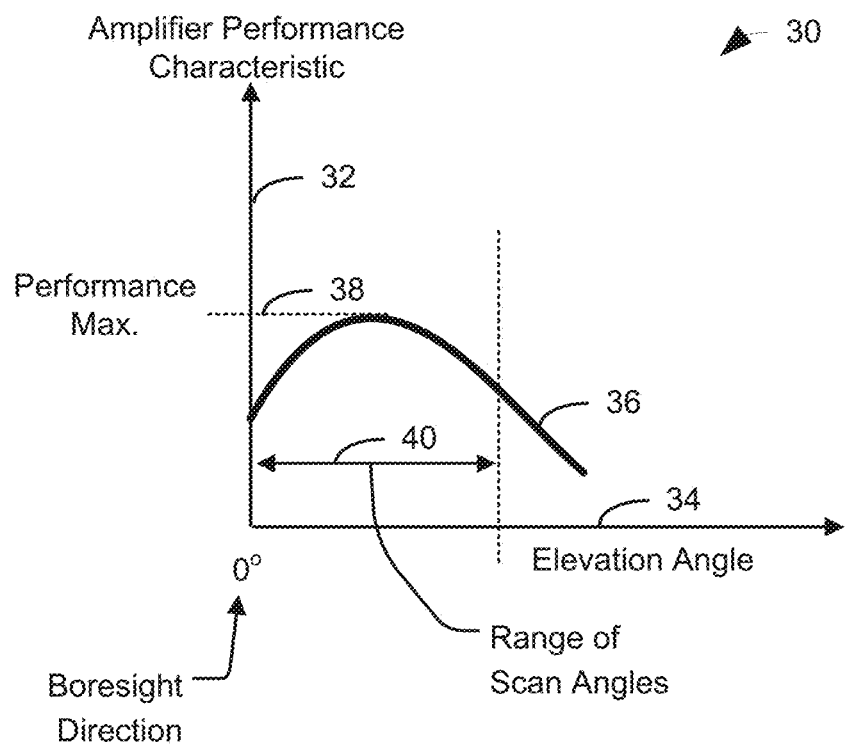
FIG. 2 is a chart illustrating the performance of one example of an amplifier tuned in accordance with the system and methods presented herein.

FIG. 2 is a chart 30 illustrating the performance of one example of an amplifier configured in accordance with the system and methods presented herein. Specifically, the amplifier is configured such that the maximum of a performance characteristic corresponds to an antenna impedance at a scan angle different from the boresight direction. The amplifier performance is represented by a vertical axis 32 with a higher value indicating better performance, and the elevation angle is represented in degrees relative to a boresight direction on a horizontal axis 34. As can be seen from the plot 36, the amplifier performance reaches a maximum value 38 maximized at a scan angle toward the center of a range of scan angles 40 associated with the system, as opposed to the boresight direction.

Figure 3:
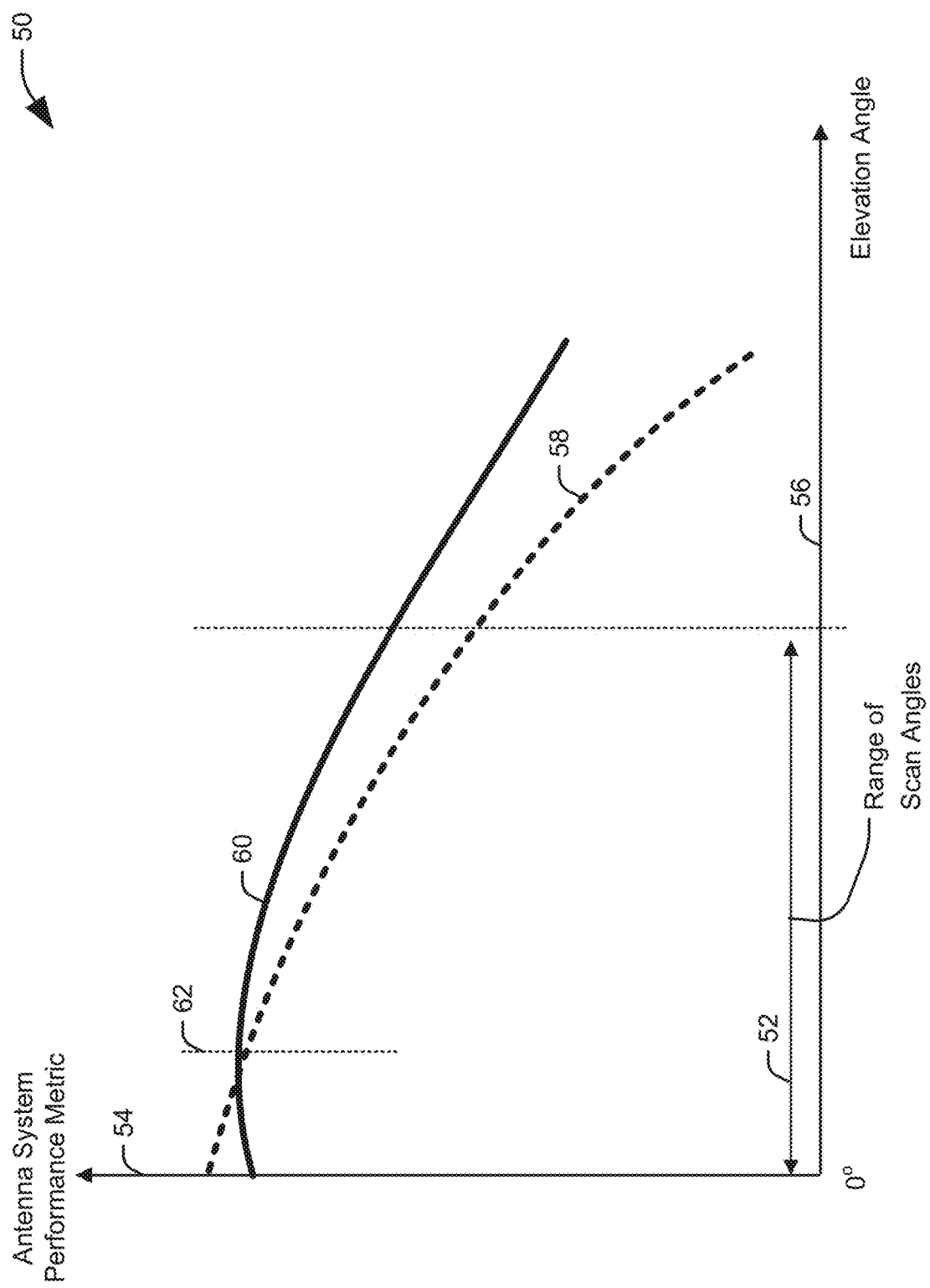
FIG. 3 is a chart illustrating the reduction of variation in the antenna system performance over a range of scan angles associated with the system.

As will be described in detail herein, this reduces variation of an antenna system performance metric, for example, a gain-to-noise temperature ratio (G/T) for a received signal or the equivalent isotropically radiated power (EIRP) for a transmit signal, over the scan angle, providing improved performance at high scan angles. FIG. 3 is a chart 50 illustrating the reduction of variation in the antenna system performance metric over a range of scan angles 52 the phased array antenna is configured to operate. The antenna system performance metric is represented by a vertical axis 54 with a higher value indicating better performance, and the elevation angle is represented in degrees relative to a boresight direction on a horizontal axis 56. A first plot 58 represents the performance of a system lacking the improvements described herein. As can be seen from the plot 58, the antenna performance metric for such a system is at its maximum at the boresight direction and sharply declines as the elevation angle varies from the boresight direction.

A second plot 60 represents the performance of a system utilizing amplifiers configured as described herein such that the maximum of a performance characteristic of the amplifiers corresponds to the antenna impedance at a scan angle different than the boresight direction (0 degrees in this example), as shown for example in FIG. 2. At boresight, the antenna gain is at a maximum, while the amplifier performance is reduced relative to its maximum performance. Accordingly, the overall performance of the system at the boresight direction is slightly degraded relative to the system represented in the first plot 58. At larger scan angles, the antenna gain is lower, but the amplifier performance is less degraded compared to the maximum performance corresponding to boresight. As a result, the antenna performance actually improves as the elevation angle departs from the boresight direction, until a point is reached for which the antenna performance is maximized. It will be appreciated that the maximum performance will generally be provided for a scan angle between the scan angle for which the antenna impedance has been tuned and the boresight direction. The antenna performance then degrades gradually as the elevation angle departs further than boresight, but significantly more gradually than the system represented by the first plot 58, providing superior performance over the majority of the range of scan angles 52. As a result, the antenna performance is collectively maximized over the range of scan angles 52.

Figure 4:
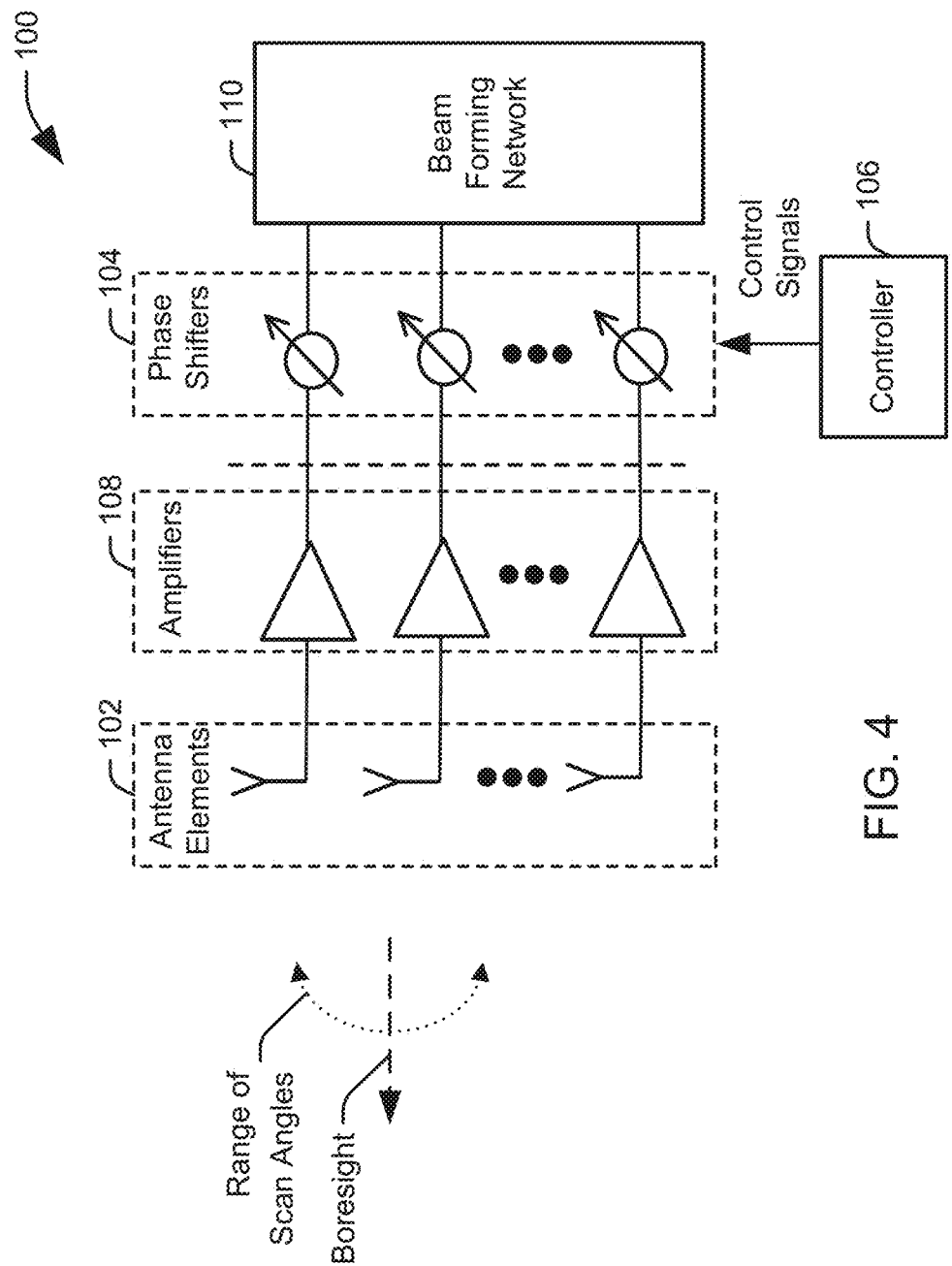
FIG. 4 illustrates an example of a phased array antenna.

FIG. 4 illustrates an example of a phased array antenna 100. It will be appreciated that the phased array antenna 100 is a simplified representation provided for the purpose of example, and that the antenna can include additional components that are not illustrated herein. The phased array antenna comprises an array of antenna elements 102 that provide a beam with a boresight direction. A plurality of phase shifters 104 are responsive to commands to adjust phases of a plurality of radio frequency (RF) signals communicated with the array of antenna elements 102. A controller 106 provides the commands to the plurality of phase shifters 104. The controller 106 can be implemented in hardware, for example, as one or more application specific integrated circuits (ASICs), custom field programmable gate array (FPGA) chips, in software, as machine executable instructions stored on a non-transitory medium and executed by an associated processor, or as a combination of hardware and software. The provided commands are used by the plurality of phase shifters 104 to scan the beam within a range of scan angles relative to the boresight direction.

A plurality of amplifiers 108 amplify the plurality of signals. In the illustrated implementation, the amplifiers 108 amplify the received signal, and thus may be implemented as low-noise amplifiers, although it will be appreciated that the characteristics of the amplifiers can vary. Each of the plurality of amplifiers 108 is coupled to an antenna port of the array of antenna elements 102 and as a result has a performance characteristic that depends on antenna port impedance at the antenna port. The antenna impedance varies with a scan angle of the beam within the range of scan angles, and the amplifiers 108 are configured such that a maximum of the performance characteristic, such as output SNR to input SNR, is achieved at a value of the antenna port impedance that corresponds to a particular scan angle within the range of scan angles that differs from the boresight direction. As mentioned above, maximizing output SNR to input SNR of the amplifiers 108 is equivalent to minimizing noise figure of the amplifiers 108, and thus minimizing noise figure (also called "noise matched") is described hereinafter for convenience. The manner in which the amplifiers 108 are configured to be noise matched to the particular antenna port impedance value that corresponds to the particular scan angle can vary among implementations. For example, an input matching network of the amplifier may designed to provide the appropriate impedance transformation, the amplifier bias current may be selected that achieves the noise match, degeneration can be used, or any other appropriate method for selecting the impedance can be employed.

Figure 5:
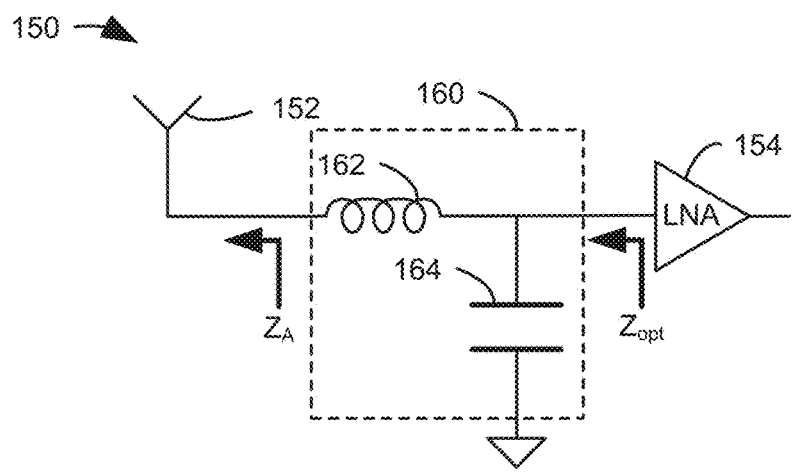
FIG. 5 illustrates a schematic diagram of an antenna path with an antenna element and a low noise amplifier connected by an impedance matching network.

FIG. 5 illustrates a schematic diagram of an antenna path 150 with an antenna element 152 and a low noise amplifier (LNA) 154 connected by an impedance matching network 160. The impedance matching network 160 and the LNA 154 may for example collectively implement one of the amplifiers 108 of FIG. 4. In the illustrated example, the impedance matching network 160 is implemented as a series-L network, with an inductor 162 in series between the antenna element 152 and the low noise amplifier 154, and a shunt capacitor 164. Values for the inductance of the inductor 162 and the capacitance of the capacitor 164 can be selected to adjust the source impedance seen at the input of the low noise amplifier 154 to a desired value, $Z_{opt}$, from a known value for the impedance, $Z_A$, at a port of the antenna element 152.

Figures 6, 7:
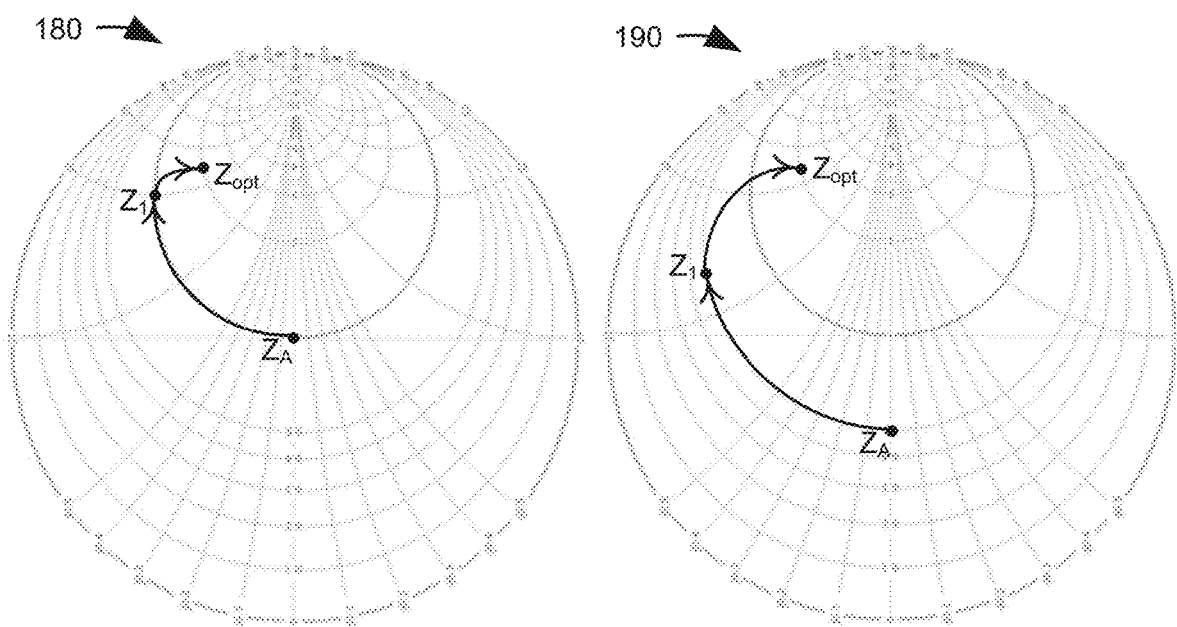
FIG. 6 is a Smith chart illustrating one example of an impedance transformation provided via the impedance matching network of FIG. 2.
FIG. 7 is a Smith chart illustrating another example of an impedance transformation provided via the impedance matching network of FIG. 2.

FIG. 6 is a Smith chart 180 illustrating one example of an impedance transformation provided via the impedance matching network of FIG. 5. In the illustrated example, a scan angle of the phase array is at the boresight, and an impedance seen at the antenna port is labeled as $Z_A$. The first step in the transformation is placing an inductance, from the inductor 162, in series with the antenna output. This moves the impedance to the point labeled $Z_1$ in the Smith chart. The value of the inductance is determined by the value of reactance needed to move from $Z_A$ to point $Z_1$ along the unity circle. The second step is to place the shunt capacitor to arrive at the optimum source impedance Zopt. The value of the capacitor is determined by the susceptance needed to move from point $Z_1$ to $Z_{opt}$.

FIG. 7 is a Smith chart 190 illustrating another example of an impedance transformation provided via the impedance matching network of FIG. 5. In the illustrated example, a scan angle of the phase array is at a scan angle different than the boresight, and the impedance seen at the antenna port is accordingly different from that depicted in FIG. 3. The example of FIG. 4 can also utilize the impedance matching network illustrated in FIG. 2, but the values for the inductance of the inductor 162 and the capacitance of the capacitor 164 are changed to adjust for the change in impedance at the antenna port. In the specific example of FIG. 4, each of the impedance and the capacitance are increased from the values used in FIG. 3.

Returning to FIG. 4, during operation, the illustrated phased array antenna 100 is configured to receive a signal from a desired scan angle direction relative to the boresight direction. Each of the plurality of antenna elements 102 receives an element signal (also referred to herein as "receive signals"), which is then amplified by a corresponding one of the plurality of amplifiers 108. The amplified element signals are then provided to the plurality of phase shifters 104, which applies appropriate phase shifts to the element signals based on the desired scan angle of the beam, as indicated by control signals (also referred to herein as "commands") from the controller 106. The phase shifted element signals are then provided to a beam forming network 110, which combines the element signals to produce a beam signal corresponding to the desired scan angle. In the illustrated embodiment, the desired scan angle is achieved by adjusting the phase of the element signals via the phase shifters 104. In some embodiments, the phased array antenna 100 further includes amplitude adjustment circuits (e.g., variable gain amplifiers) to further adjust the amplitude of the element signals in response to the control signals.

One parameter determining the noise figure of a low noise amplifier is the source impedance, $Z_{source}$, presented at its input. Ideally, $Z_{source}$ is a fixed value that provides the lowest noise figure (referred to as noise matched). However, in a phased array antenna, the antenna port impedance, $Z_A$, referred to as the active or scan impedance, changes with scan angle, and thus the source impedance is not constant.

The noise optimization employed herein can be better understood from Eq (1):

$$F = F_{min} + \frac{R_N}{G_S}|Y_S - Y_{opt}|^2 \qquad \text{Eq. 1}$$

where $Y_S = G_S + jB_S$ is the source admittance presented to the active circuitry of the amplifier, $Y_{opt}$ is the optimum source admittance that results in minimum noise figure, $F_{min}$ is a minimum noise figure of the active circuitry of amplifier, attained when $Y_S = Y_{opt}$, $R_N$ is the equivalent noise resistance of the active circuitry of amplifier, $G_S$ is the real part of source admittance, and F is the noise factor.

From Eq (1), it can be seen that if the actual source admittance, $Y_S$, presented to the amplifier is equal to the optimum source impedance, $Y_{opt}$, the second term in Eq (1) becomes zero. In this case, the noise figure will assume the minimum value achievable. Accordingly, to improve the overall performance of the antenna system 100 at higher scan angles at the expense of slightly lower performance at boresight, the low noise amplifiers are configured to be noise matched to a particular value of the antenna port impedance, $Z_A$, that corresponds to a particular scan angle that differs from the boresight direction. Where the antenna system is used to receive a signal having a frequency range, the particular value of the antenna port impedance $Z_A$ may be selected for one of the frequencies in the frequency range, including a maximum frequency, a minimum frequency, a center frequency, or other representative frequency within the range.

In some implementations, the particular scan angle is selected based on the resulting values of the antenna system performance metric at one or more scan angles. Using the example of a gain-to-noise-temperature ratio for the performance metric, it will be appreciated that a maximum gain of the phased array antenna 100, $G(\theta)$, is a function of the scan angle, $\theta$, with the maximum gain being provided at boresight. Similarly, the noise factor, and thus the noise temperature, is a function of the mismatch of the source admittance presented to the amplifier to an optimal source admittance for the amplifier, as discussed in Eq. 1. The antenna port impedance, and thus the admittance, varies with the scan angle, $\theta$, and thus the noise factor, F, is a function of each of the scan angle and a selected optimal source admittance for the amplifier, which we represent here as a specific scan angle, $\theta_{opt}$, for which the optimal source impedance matches the admittance at the antenna port.

In one example, the particular scan angle may be selected to provide a predetermined minimum value of the antenna system performance metric across a largest possible range of scan angles. It will be appreciated that the impedance mismatch at angles far from the boresight direction will decrease as the particular scan angle is varied away from the boresight direction. Accordingly, in one implementation, the particular scan angle can be varied across a range of scan angles away from the boresight direction until the antenna system performance metric drops below the predetermined minimum for at least one scan angle within the range, with the largest deviation of the particular scan angle from the boresight direction that maintains the minimum performance across the predetermined range selected.

In another implementation, the value for the particular scan angle is selected to maximize a minimum value for the gain-to-noise-temperature ratio across a predetermined range of scan angles. In this instance, the optimization problem is to select a source admittance for the amplifier that maximizes the value:

$$\min_i \left( \frac{G(\theta_i)}{T_0[F(\theta_i, \theta_{opt}) - 1]} \right) \qquad \text{Eq. 2}$$

where $\theta_i$ varies within a defined range of scan angles, $[\theta_1, \theta_N]$, and $T_0$ is 273 K.

It will be appreciated that the change in the gain with the scan angle, and the change in the noise angle with the scan angle can be modeled based on a design of the phased array antenna 100, and thus an optimal value for $\theta_{opt}$ can be determined via an appropriate optimization algorithm, such as a gradient search. Alternatively, a "brute force" approach can be employed, in which each of a plurality of preselected values for the particular scan angle, $\theta_{opt}$, are evaluated and a maximum value is selected.

In one implementation consistent with this example, the scan angle is selected to maintain at least a minimum value for the antenna performance metric at a maximum scan angle of the operating range of scan angles, such that the defined range of scan angles encompasses the entire operating range of the phased antenna array 100. Alternatively, the particular scan angle may be selected to provide the predetermined minimum value of the antenna system performance metric across or a selected proper subset of scan angles within the range of scan angles. It will be appreciated that the selected subset of scan angles can exclude the boresight direction.

In another implementation, the particular scan angle is selected based on the maximum scan angle, such that the selected scan angle is at a predetermined location, between the boresight direction and the maximum scan angle, such as halfway between the boresight direction and the maximum scan angle. For example, if the maximum scan angle is sixty degrees elevation from the boresight direction, the amplifiers 108 may be noise matched to the antenna port impedance corresponding to thirty degrees elevation.

In a further example, the particular scan angle is selected such that a total sum of the performance metric across all scan angles within the range of scan angles or a proper subset of the range of scan angles is maximized. Again using the gain-to-noise-temperature ratio, the optimization problem can be expressed as selecting the particular scan angle, $\theta_{opt}$, that maximizes the value over the defined range of scan angles, $[\theta_1, \theta_N]$:

$$\sum_{i=1}^{N} \left( \frac{G(\theta_i)}{T_0[F(\theta_i, \theta_{opt}) - 1]} \right) \qquad \text{Eq. 3}$$

Figure 8:
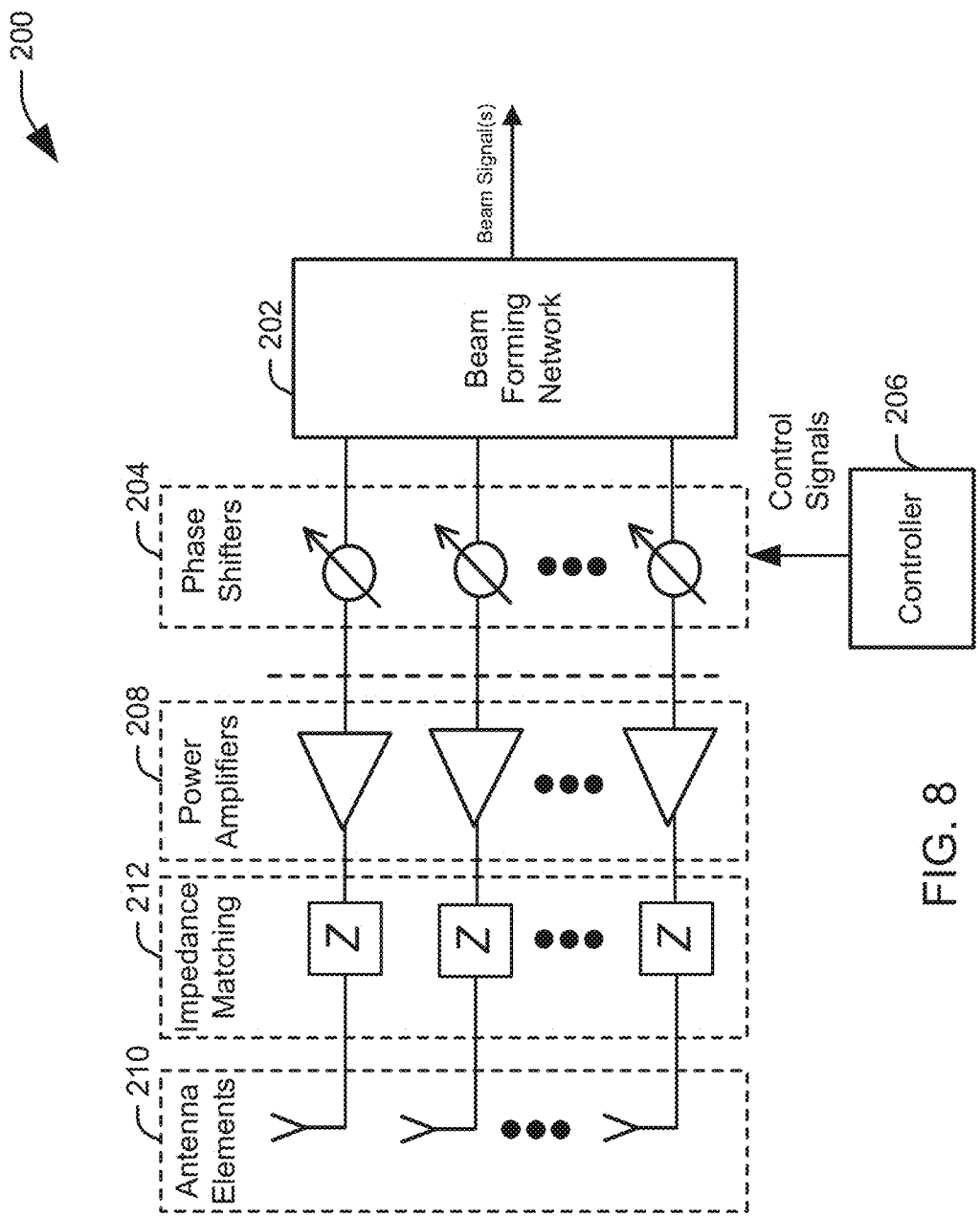
FIG. 8 illustrates one implementation of a phased array antenna utilizing amplifiers configured for maximum performance at a scan angle other than the boresight direction.

FIG. 8 illustrates one implementation of a phased array antenna 200 utilizing amplifiers configured for maximum performance at a scan angle other than the boresight direction. In the illustrated implementation, the phase array antenna 200 is configured to transmit a signal in a desired scan angle direction relative to a boresight direction. A beamforming network 202 receives a beam signal that is intended to be transmitted in the desired scan angle direction. The beam forming network 202 divides the beam signal into element signals (also referred to herein as "transmit signals"), which are provided to a plurality of phase shifters 204. Each of the plurality of phase shifters 204 are responsive to control signals from a controller 206 to provide appropriate phase shifts to the signals based on a desired scan angle of the beam. The phase shifted signals are then amplified by a plurality of power amplifiers 208 and provided to the antenna elements 210 for transmission to produce a transmit beam in the desired scan angle direction. In the illustrated embodiment, the desired scan angle is achieved by adjusting the phase of the element signals via the phase shifters 204. In some embodiments, the phased array antenna 100 further includes amplitude adjustment circuits (e.g., variable gain amplifiers) to further adjust the amplitude of the element signals in response to the control signals.

Power amplifiers are designed for a given output power level. One parameter that determines the output power level is the load impedance, $Z_{Load}$, presented at its output. Ideally, $Z_{Load}$ is a fixed value that permits the power amplifier to produce the given output power level. However, in a phased array antenna, the antenna port impedance, $Z_A$, changes with scan angle, and thus the load impedance $Z_{Load}$, is not constant. To improve an antenna performance metric, such as an equivalent radiated power or an equivalent isotropically radiated power of the antenna, at higher scan angles at the expense of slightly lower performance at boresight, the power amplifiers 208 are configured to provide maximum output power at a particular value of the antenna port impedance, $Z_A$, that corresponds to a particular scan angle that differs from the boresight direction. In the illustrated implementation, a plurality of impedance matching networks 212 are implemented between the antennas 210 and the amplifiers 208. The impedance matching networks 212 adjust the antenna impedance to a desired load impedance. In one implementation, comprising an integrated circuit design, impedance matching networks can be designed using lumped components such as inductors and capacitor.

Using the example of an effective isotropic radiated power (EIRP) for the performance metric, it will be appreciated that a maximum power of the phased array antenna 100, $G(\theta)$, is a function of the scan angle, $\theta$, with the maximum gain being provided at boresight. Some power can be lost due to a mismatch of the impedance at the power amplifier to an impedance at the antenna port. The antenna port impedance, and thus the admittance, varies with the scan angle, $\theta$, and thus the reflected power, R, is a function of each of the scan angle and a selected optimal source impedance for the amplifier, which we represent here as a specific scan angle, $\theta_{opt}$, for which the optimal source impedance matches the admittance at the antenna port.

In one example, the particular scan angle may be selected to provide a predetermined minimum value of the antenna system performance metric across a largest possible range of scan angles. It will be appreciated that the impedance mismatch at angles far from the boresight angle will decrease as the particular scan angle is varied away from the boresight direction. Accordingly, in one implementation, the particular scan angle can be varied across a range of scan angles away from the boresight direction until the antenna system performance metric drops below the predetermined minimum for at least one scan angle within the range, with the largest deviation of the particular scan angle from the boresight direction that maintains the minimum performance across the predetermined range selected.

In another implementation, the value for the particular scan angle is selected to maximize a minimum value for ERIP across a predetermined range of scan angles. In this instance, the optimization problem is to select a source admittance for the amplifier that maximizes the value:

$$\min_i \left( \frac{I(\theta_i) - R(\theta_i, \theta_{opt})}{I_{iso}} \right) P_{in} \qquad \text{Eq. 4}$$

where $\theta_i$ varies within a defined range of scan angles, $[\theta_1, \theta_N]$, $P_{in}$ is an power input to the system, and $I_{iso}$ is the power radiated in the direction of the scan angle by a hypothetical lossless isotropic antenna.

It will be appreciated that the change in the gain with the scan angle, and the change in the reflected power with the scan angle can be modeled based on a design of the phased array antenna 100, and thus an optimal value for $\theta_{opt}$ can be determined via an appropriate optimization algorithm, such as a gradient search. Alternatively, a "brute force" approach can be employed, in which each of a plurality of preselected values for the particular scan angle, $\theta_{opt}$, are evaluated and a maximum value is selected.

In one implementation consistent with this example, the scan angle is selected to maintain at least a minimum value for the EIRP at a maximum scan angle of the operating range of scan angles, such that the defined range of scan angles encompasses the entire operating range of the phased antenna array 100. Alternatively, the particular scan angle may be selected to provide the predetermined minimum value of the EIRP or other performance metric across a selected proper subset of scan angles within the range of scan angles. It will be appreciated that the selected subset of scan angles can exclude the boresight angle.

In another implementation, the particular scan angle is selected based on the maximum scan angle, such that the selected scan angle is at a predetermined location, between the boresight direction and the maximum scan angle, such as halfway between the boresight direction and the maximum scan angle. For example, if the maximum scan angle is sixty degrees elevation from the boresight direction, the power amplifiers 208 may be noise matched to the antenna port impedance corresponding to thirty degrees elevation.

In a further example, the particular scan angle is selected such that a total sum of the EIRP or other performance metric across all scan angles within the range of scan angles or a proper subset of the range of scan angles is maximized. The optimization problem can be expressed as selecting the particular scan angle, $\theta_{opt}$, that maximizes the value over the defined range of scan angles, $[\theta_1, \theta_N]$:

$$\sum_{i=1}^{N} \left( \frac{I(\theta) - R(\theta, \theta_{opt})}{I_{iso}} \right) P_{in} \qquad \text{Eq. 5}$$

Figure 9:
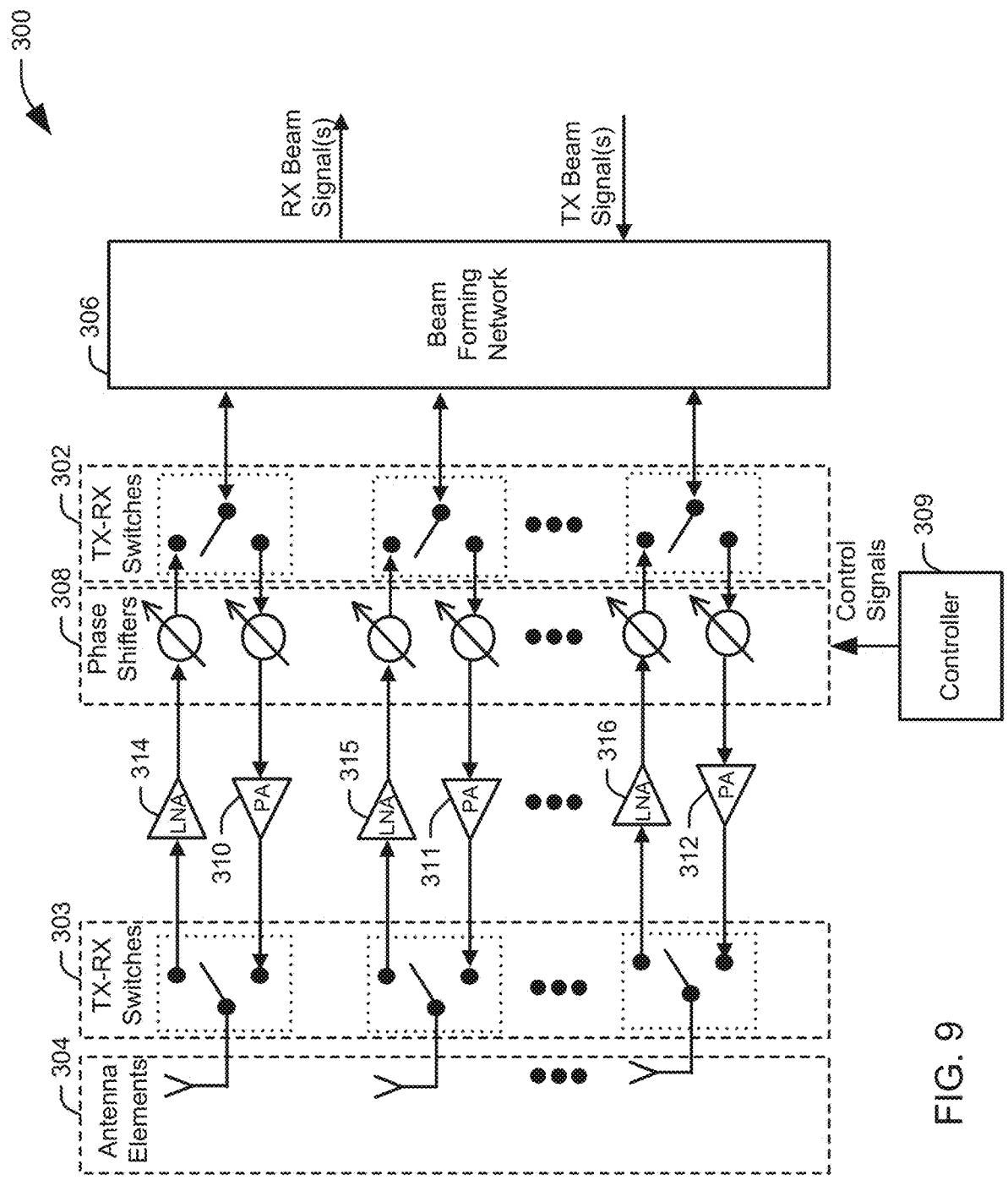
FIG. 9 illustrates another implementation of a phased array antenna utilizing amplifiers configured for maximum performance at a scan angle other than the boresight direction.

FIG. 9 illustrates another implementation of a phased array antenna 300 utilizing amplifiers configured for maximum performance at a scan angle other than the boresight direction. In the illustrated implementation, the phase array antenna 300 is configured in a half-duplex arrangement to transmit and receive radio frequency signals in a desired scan angle direction relative to a boresight direction. In the half-duplex arrangement, two sets of transmit/receive (Tx-Rx) switches 302 and 303 are used to switch the antenna 300 between a transmission path and a receive path for each of a plurality of antenna elements 304. During transmission, a beamforming network 306 receives a beam signal that is intended to be transmitted in the desired scan angle direction. The beam forming network 306 divides the beam signal into element signals, which are provided to a plurality of phase shifters 308. Each of the plurality of phase shifters 308 are responsive to control signals from a controller 309 to provide appropriate phase shifts to the signals based on a desired scan angle of the beam. The phase shifted signals are then amplified by a plurality of power amplifiers (PAs) 310-312 and provided to the antenna elements 304 for transmission to produce a transmit beam in the desired scan angle direction.

During reception, each of the plurality of antenna elements 304 receives an element signal, which is then amplified by a corresponding one of a plurality of low noise amplifiers (LNAs) 314-316. The amplified signals are then provided to the plurality of phase shifters 308, which apply appropriate phase shifts to the signals based on the desired scan angle of the beam, as provided by the controller 309. The phase shifted signals are then provided to the beam forming network 306, which combines the signals to produce a beam signal corresponding to the desired scan angle.

Due to reciprocity, the antenna port impedance, $Z_A$, of the antenna elements versus scan angle is the same for transmission and reception, assuming the same frequencies are used. However, the performance variation of the low noise amplifiers with changes in the antenna port impedance can be different than the performance variation of the power amplifiers for varying antenna port impedance. These differences in amplifier performance variation may result in different values of the antenna port impedance, and thus different particular scan angles, being selected for the low noise amplifiers 314-316 and power amplifiers 310-312, respectively. The receive performance metric for reception, such as a gain-to-noise temperature ratio, may depend on the performance variation of the low noise amplifiers 314-316 differently than the way in which the performance metric for transmission, such as an equivalent isotropically radiated power, depends on the performance variation of the power amplifiers 310-312. Accordingly, in some implementations, the low noise amplifiers are configured to be noise matched at a first value of the antenna port impedance that corresponds to a first scan angle, while the power amplifiers are configured for maximum output power at the second value of the antenna port impedance that corresponds to a second scan angle different than the first scan angle.

Figure 10:
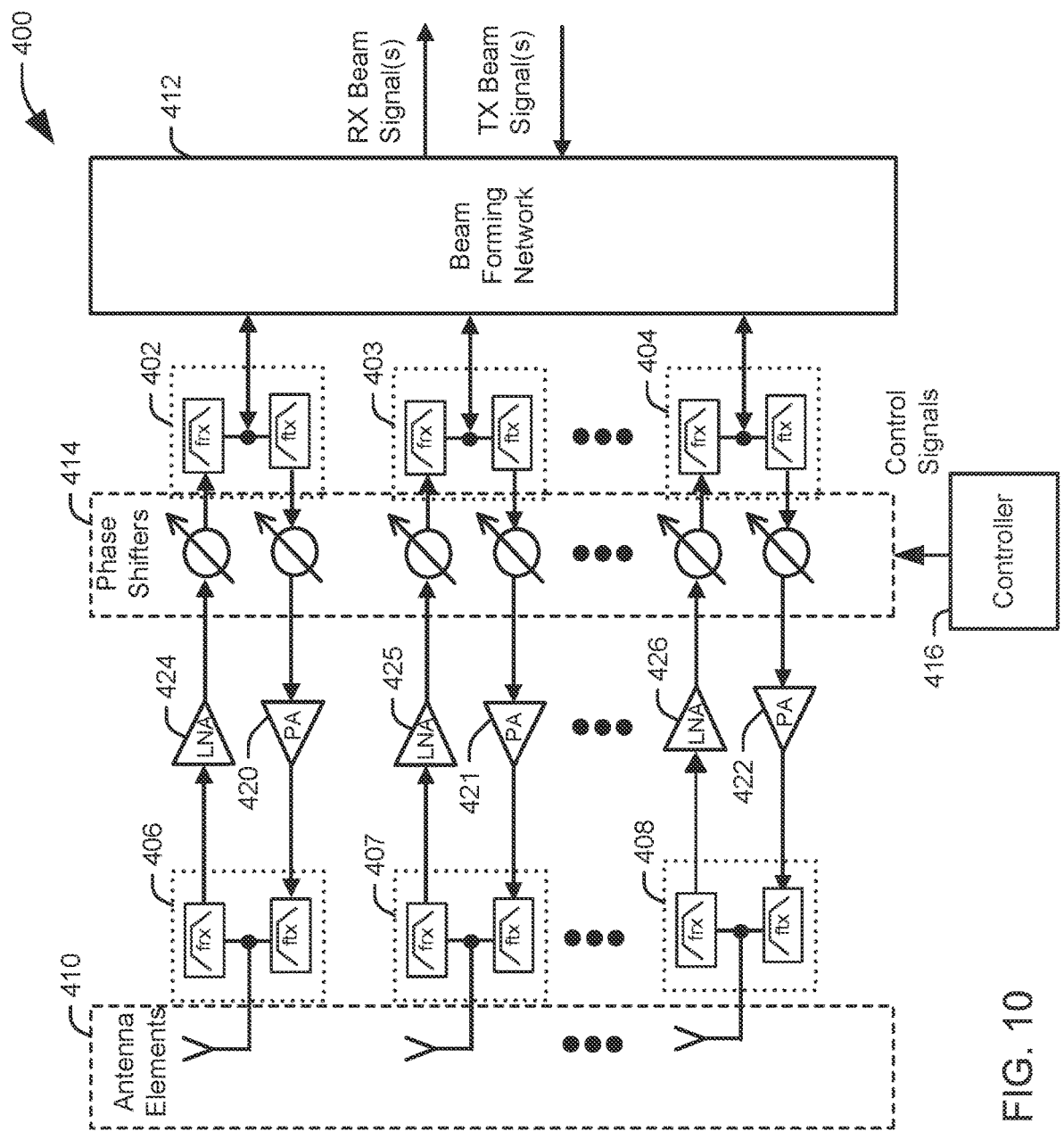
FIG. 10 illustrates yet another implementation of a phased array antenna utilizing amplifiers configured for maximum performance at a scan angle other than the boresight direction.

FIG. 10 illustrates yet another implementation of a phased array antenna 400 utilizing amplifiers configured for maximum performance at a scan angle other than the boresight direction. In the illustrated implementation, the phase array antenna 400 is configured in a frequency division duplex arrangement to transmit and receive radio frequency signals in a desired scan angle direction relative to a boresight direction. In the frequency division duplex arrangement, two sets of diplexers 402-404 and 406-408 that permit a plurality of antenna elements 410 to be used for both transmit and receive. During transmission, a beamforming network 412 receives a beam signal that is intended to be transmitted in the desired scan angle direction. The beam forming network 412 divides the beam signal into element signals, which are provided to a plurality of phase shifters 414. Each of the plurality of phase shifters 414 are responsive to control signals from a controller 416 to provide appropriate phase shifts to the signals based on a desired scan angle of the beam. The phase shifted signals are then amplified by a plurality of power amplifiers (PAs) 420-422 and provided to the antenna elements 410 for transmission to produce a transmit beam in the desired scan angle direction.

During reception, each of the plurality of antenna elements 410 receives an element signal, which is then amplified by a corresponding one of a plurality of low noise amplifiers (LNAs) 424-426. The amplified signals are then provided to the plurality of phase shifters 414, which apply appropriate phase shifts to the signals based on the desired scan angle of the beam, as provided by the controller 416. The phase shifted signals are then provided to the beam forming network 412, which combines the signals to produce a beam signal corresponding to the desired scan angle.

Since different frequencies are used for transmission and reception, the change in the antenna port impedance of the antenna elements across scan angles can be different for transmission and reception. As a result, different values of the antenna port impedance may be selected for the low-noise amplifiers and power amplifiers respectively. Accordingly, in some implementations, the low noise amplifiers are configured to be noise matched at a first value of the antenna port impedance that corresponds to a first scan angle, while the power amplifiers are configured for maximum output power at the second value of the antenna port impedance that corresponds to a second scan angle different than the first scan angle.

Figure 11:
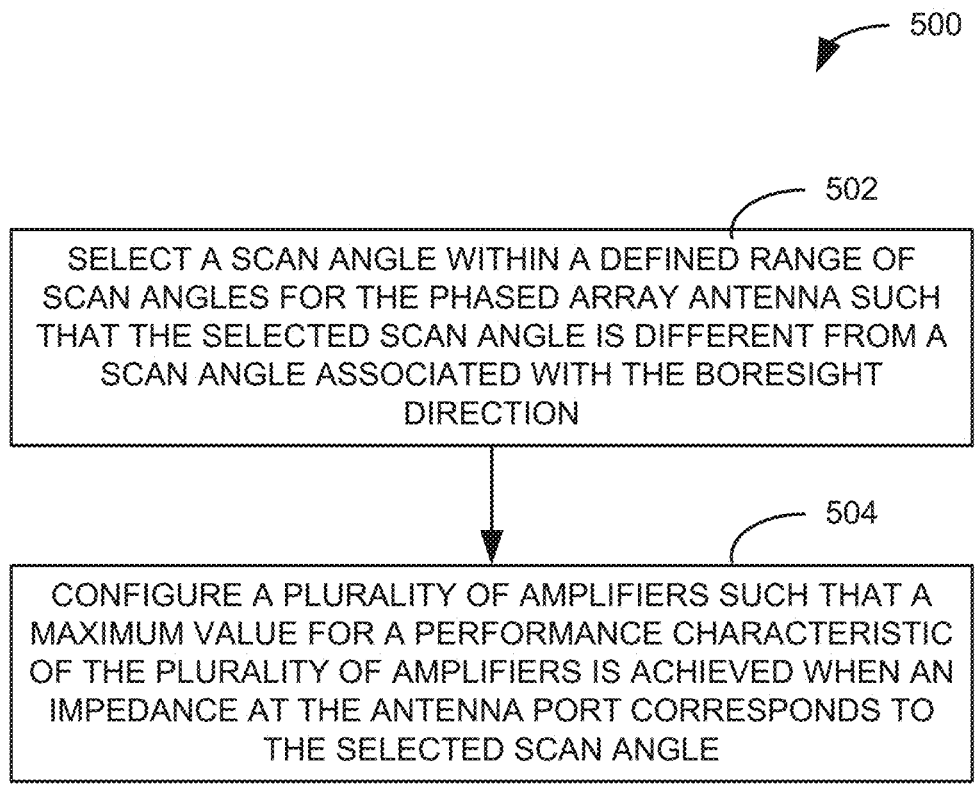
FIG. 11 illustrates an example of a method for implementing a phased array antenna having a boresight direction.

In view of the foregoing structural and functional features described above, an example method will be better appreciated with reference to FIG. 11. While, for purposes of simplicity of explanation, the example method of FIG. 11 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 11 illustrates an example of a method 500 for implementing a phased array antenna having a boresight direction. At 502, a scan angle within a defined range of scan angles for the phased array antenna is selected such that the selected scan angle is different from a scan angle associated with the boresight direction. At 504, a plurality of amplifiers, each coupled to an antenna port of one of the plurality of antenna elements, are configured such that a maximum value for a performance characteristic of the plurality of amplifiers is achieved when an impedance at the antenna port corresponds to the selected scan angle. In one implementation, the amplifiers are configured by providing an impedance matching network for each of the plurality of amplifiers to adjust the impedance at the antenna port to which the amplifier is connected.

It will be appreciated that the scan angle can be selected to maximize a performance metric for the phased array antenna across a range of scan angles, which can include all scan angles in an operating range of the phased array antenna or a proper subset of the operating range. Appropriate performance metrics for the phased array antenna can include, for example, a gain-to-noise temperature ratio, an effective radiated power, and an effective isotropic radiated power. In one implementation, the scan angle is selected to provide an extrema for a function of a performance metric for the phased array antenna across all scan angles within all or a subset of the defined range. For example, the scan angle can be selected to maximize a total sum of the performance metric across all scan angles within all or a subset of the defined range. Alternatively, the scan angle can be selected to maximize a minimum value for the performance metric across all scan angles within all or a subset of the defined range.

The desired properties for an antenna array may differ for reception and transmission for the antenna. As a result, in one implementation, each of a first scan angle that is different from the scan angle associated with the boresight direction and a second scan angle that is different from both the scan angle associated with the boresight direction and the first scan angle can be selected. A first set of amplifiers that amplify receive signals, such as low noise amplifiers, can be configured such that a maximum value for a first performance characteristic is achieved when the impedance at the antenna port corresponds to the first scan angle, and a second set of amplifiers that amplify transmit signals, such as power amplifiers, can be configured such that a maximum value for a second performance characteristic is achieved when the impedance at the antenna port corresponds to the second scan angle. Accordingly, the antenna array can be optimized for both its transmission and reception functions.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

In view of the foregoing, the following is claimed:

1. A system comprising:
a plurality of amplifiers to amplify a plurality of signals, wherein each of the plurality of amplifiers is configured to connect to an antenna port of an array of antenna elements and has a performance characteristic that depends on an antenna port impedance at the antenna port, each of the plurality of amplifiers being noise matched to a particular fixed antenna port impedance value, and each antenna element configured to communicate a signal of the plurality of signals;
a plurality of phase shifters, each configured to adjust a phase of the signal communicated with a respective antenna element of the array of antenna elements; and
a controller to provide commands to the plurality of phase shifters, wherein the provided commands are used by the plurality of phase shifters to direct a beam within a range of scan angles relative to a boresight direction of a phased array antenna comprising the array of antenna elements;
wherein the antenna port impedance varies with a scan angle of the beam within the range of scan angles, the particular fixed antenna port impedance value corresponds to a particular scan angle that differs from the boresight direction, and the particular fixed antenna port impedance value and the corresponding particular scan angle are selected such that a minimum value for a performance metric of the phased array antenna across all scan angles within the range of scan angles is maximized.

2. The system of claim 1, further comprising a plurality of impedance matching networks, each of the impedance matching networks adjusting the impedance at the antenna port to the particular fixed antenna port impedance value such that a maximum value for the performance characteristic of the plurality of amplifiers is achieved when the antenna port impedance corresponds to the particular scan angle.

3. The system of claim 1, wherein each amplifier of the plurality of amplifiers is configured to amplify the signal of the plurality of signals for transmission at the respective antenna element, the performance metric comprising one of an effective radiated power for the phased array antenna and an effective isotropic radiated power for the phased array antenna.

4. The system of claim 1, wherein the plurality of amplifiers comprise a first plurality of amplifiers, each configured to amplify the signal of the plurality of signals received at the respective antenna element, the performance metric comprising a gain-to-noise temperature ratio for the phased array antenna.

5. A system comprising:
a plurality of amplifiers to amplify a plurality of signals, wherein each of the plurality of amplifiers is configured to connect to an antenna port of an array of antenna elements and has a performance characteristic that depends on an antenna port impedance at the antenna port, each of the plurality of amplifiers being noise matched to a particular fixed antenna port impedance value, and each antenna element, of the array of antenna elements, configured to communicate a signal of the plurality of signals;
a plurality of phase shifters, each configured to adjust a phase of the signal communicated with a respective antenna element of the array of antenna elements; and
a controller to provide commands to the plurality of phase shifters, wherein the provided commands are used by the plurality of phase shifters to direct a beam within a range of scan angles relative to a boresight direction of a phased array antenna comprising the array of antenna elements;
wherein the antenna port impedance varies with a scan angle of the beam within the range of scan angles, the particular fixed antenna port impedance value corresponds to a particular scan angle that differs from the boresight direction, and the particular fixed antenna port impedance value and the corresponding particular scan angle are selected such that a maximum value for a performance metric of the phased array antenna across all scan angles within the range of scan angles is minimized.

6. The system of claim 5, further comprising a plurality of impedance matching networks, each of the impedance matching networks adjusting the impedance at the antenna port to the particular fixed antenna port impedance value such that a maximum value for the performance characteristic of the plurality of amplifiers is achieved when the antenna port impedance corresponds to the particular scan angle.

7. The system of claim 6, wherein each of the plurality of impedance matching networks is implemented as a series-L network, with an inductor in series between the antenna port associated with the impedance matching network and an associated amplifier of the plurality of amplifiers, and a shunt capacitor, an inductance of the inductor and the capacitance of the shunt capacitor being selected to adjust a source impedance seen at an input of the associated amplifier to a desired value for the source impedance.

8. The system of claim 7, wherein the inductance of the inductor and the capacitance of the shunt capacitor are selected such that the desired value for the source impedance is equal to the particular fixed antenna port impedance.

9. A system comprising:
a plurality of amplifiers to amplify a plurality of signals, wherein each of the plurality of amplifiers is configured to connect to an antenna port of an array of antenna elements and has a performance characteristic that depends on an antenna port impedance at the antenna port, and each antenna element, of the array of antenna elements, configured to communicate a signal of the plurality of signals;
a plurality of phase shifters, each configured to adjust a phase of the signal communicated with a respective antenna element of the array of antenna elements; and
a controller to provide commands to the plurality of phase shifters, wherein the provided commands are used by the plurality of phase shifters to direct a beam within a range of scan angles relative to a boresight direction of a phased array antenna comprising the array of antenna elements, wherein the antenna port impedance varies with a scan angle of the beam within the range of scan angles, a maximum of the performance characteristic is achieved at a value of the antenna port impedance that corresponds to a particular scan angle that differs from the boresight direction, and the particular scan angle is selected such that a minimum value for a performance metric of the phased array antenna across all scan angles within the range of scan angles is maximized; and a plurality of impedance matching networks, each of the impedance matching networks adjusting an impedance at the antenna port such that a maximum value for the performance characteristic of the plurality of amplifiers is achieved when the antenna port impedance corresponds to the particular scan angle, each of the plurality of impedance matching networks being implemented as a series-L network, with an inductor in series between the antenna port associated with the impedance matching network and an associated amplifier of the plurality of amplifiers, and a shunt capacitor, an inductance of the inductor and the capacitance of the shunt capacitor being selected to adjust a source impedance seen at an input of the associated amplifier to a desired value for the source impedance.

10. The system of claim 9, wherein the inductance of the inductor and the capacitance of the shunt capacitor are selected such that the desired value for the source impedance is equal to the value of the antenna port impedance that corresponds to the particular scan angle.

\* \* \* \* \*